Figure 1:
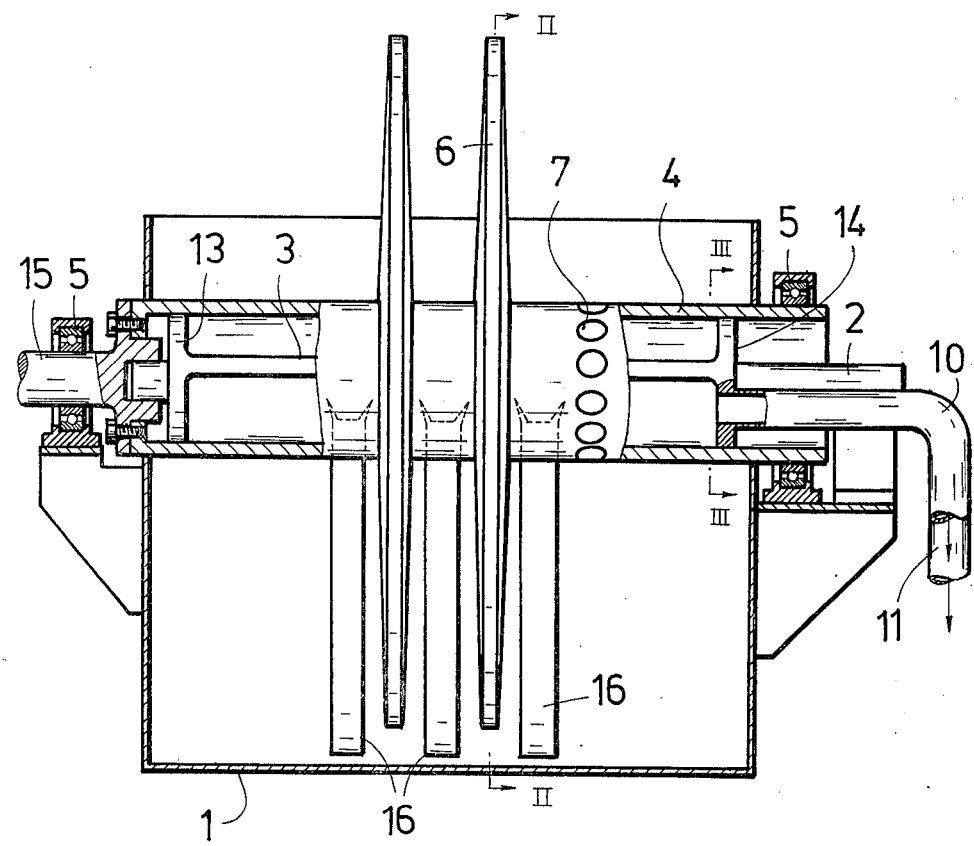

United States Patent [19]  [11]  4,123,363
Koskinen  [45]  Oct. 31, 1978

[54] DISK FILTER

[75] Inventor: Ensio Koskinen, Savonlinna, Finland

[73] Assignee: Enso-Gutzeit Osakeyhtiö, Helsinki, Finland

[21] Appl. No.: 811,206

[22] Filed: Jun. 29, 1977

[30] Foreign Application Priority Data

Jul. 2, 1976 [FI] Finland .................................. 761930

[51] Int. Cl.² ............................................ B01D 33/08
[52] U.S. Cl. ..................................... 210/331; 210/347
[58] Field of Search ................ 210/331, 404, 347, 486

[56] References Cited

U.S. PATENT DOCUMENTS

| | | | |
|---|---|---|---|
| 2,027,652 | 1/1936 | Raisch .............................. | 210/404 X |
| 3,452,874 | 7/1969 | Keller et al. ..................... | 210/404 X |
| 3,471,026 | 10/1969 | Riker ................................ | 210/331 X |

Primary Examiner—Frank A. Spear, Jr.
Attorney, Agent, or Firm—Toren, McGeady and Stanger

[57] ABSTRACT

Disk filter comprising a tank for the liquid to be filtered, a tubular shaft carrying, spaced in its longitudinal direction, filtering disks which consist of functionally independent, hollow filtering sectors communicating through holes made in the mantle of the tubular shaft and located at the tips of the sectors with the interior space of the tubular shaft, the different filtrates coming from the filtering sectors being removed from the different chambers with the aid of vacuum introduced into said interior space. The chambers are established when within the tubular shaft there is placed a slide member which is stationary as the shaft rotates and which divides the interior of the shaft in the transversal direction into sectors and which is confined by ends at either of the shaft.

2 Claims, 3 Drawing Figures

DISK FILTER

The present invention concerns a disk filter by means of which from a liquid solid substances suspended therein are removed. The disk filter of the invention is paticularly well usable when removing fibres from water.

For fibre removal from water generally disk filters are used in which on a rotating shaft a number of disks have been mounted after each other, each of them being divided to constitute functionally independent hollow filtering sectors. Each sector communicates by an aperture at its tip with the interior of the shaft, where a vacuum is introduced. When the sector dips into a tank containing fibre suspension which is meant to be filtered, a fiber course begins to precipitate under effect of the vacuum prevailing within the shaft upon the mesh surface of the sector, as the water escapes therefrom into the interior of the filtering sector, whence the filtrate travels through the hole at the tip of the sector into a duct placed within the shaft and having a length substantially equal to that of the shaft, which duct has been formed by dividing the interior of the shaft into parts by a longitudinal partition. When the disk filter is rotating, all sectors following each other in the direction of the axis which are in the same angular position discharge their filtrate into one and the same duct, since the ducts have been formed by the aid of partitions affixed to the interior of the shaft and rotate therefore along with it. The shaft carries at one end a distribution valve, which distributes the filtrates coming from different ducts into two different pipes. Furthermore this distributing valve shuts off the suction when the sector rises to be above the liquid level.

In the above-described disk filter two filtrates differing as regards their degree of purity are produced. The first: when the sector dips under the liquid level for the first time, when the suction begins to act through the clean mesh surface and pulls powerfully along particularly the fine substance present in the fibre suspension, so that part of it also ends up in the filtrate. In the further course of rotation of the sector the fibre mat which is formed on its surface prevents the fine matter from being entrained in the filtrate because the pores between felted fibres are quite considerably smaller than the holes in the mesh of the filtering sector. If follows that the filtrate formed later in the direction of rotation of the filtering sector is of higher purity than the filtrate produced at the beginning.

This disk filter is encumbered by the functional shortcoming that the initially aspirated more impure fraction from a filtering sector located far from that end of the shaft where the distributing valve has been placed tends to become mixed with the later aspirated purer fraction coming from a filtering sector close to the distributing valve; this is because the fraction coming from a point distant to the distributing valve has to travel through a long duct having a length equal to that of the whole shaft, and this takes time. However, during this time the shaft has turned through such an angle that on the filtering sectors close to the distributing valve a fibre layer has already been formed, owing to which the filtrate from these entering the same duct has a higher purity. It follows that earlier aspirated less pure fraction is admixed to the purer filtrate in the part of the duct close to the distributing valve.

The object of the present invention is to eliminate the delay mentioned and the consequent admixing of less pure fraction with a fraction of higher purity, this being achieved in the way presented in the claims. When the interior of the shaft is divided into two different chambers by means of a stationary slide member constituting a distribution valve, the delay mentioned above is completely abolished and each chamber contains only filtrate that has come from filtering sectors in the same phase or angular position, whereby the concentration of the filtrate does not vary in the longitudinal direction of the chamber as it does in the above-mentioned disk filter of prior art. The disk filter of the invention also has a less complex design because the complicated distribution valve at one shaft end of the disk filters of prior art is omitted altogether.

Figure 2:
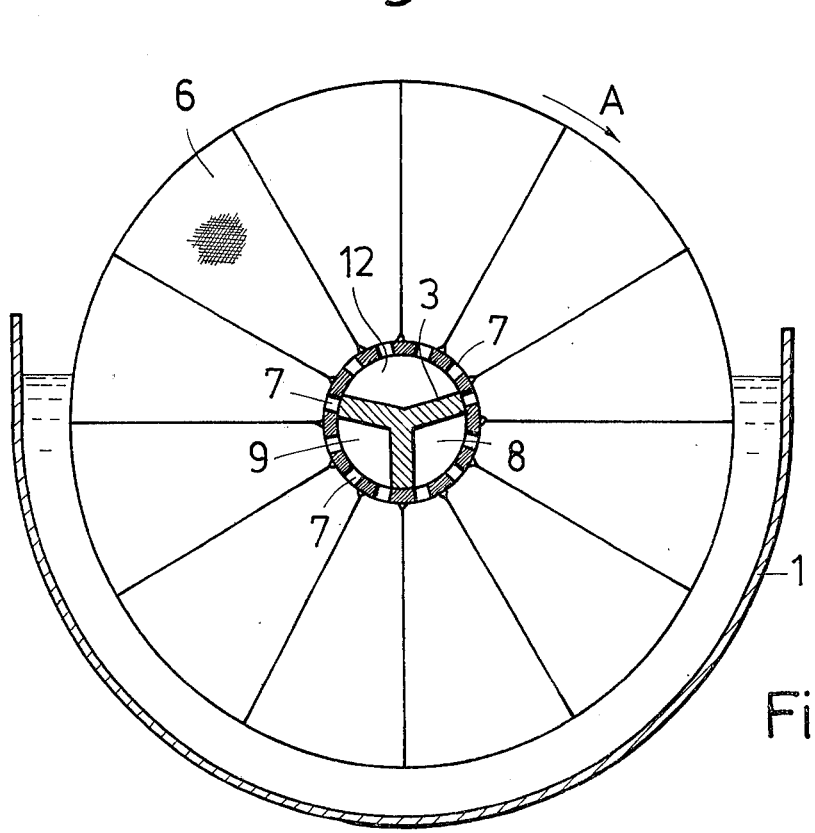
Figure 3:
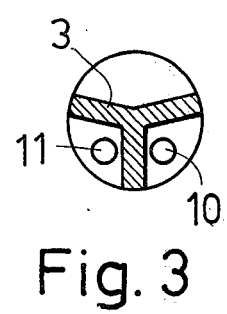

A favourable embodiment of the invention is described in the following in detail with the aid of the drawing, FIG. 1 presenting in elevational view a disk filter according to the invention, the shaft of the filter having been partially cut longitudinally;

FIG. 2 shows the cross section of the filter viewed in the direction of line II—II in FIG. 1; and FIG. 3 shows the cross section of the shaft of the filter, viewed in the direction of line III—III in FIG. 1.

The filter according to the invention rotates as shown in FIG. 1 supported by its shaft 4 in the tank 1, into which the fibre suspension to be filtered is supplied. The shaft 4 is a tube extending over the whole length of the tank 1 and carried at both ends in bearings 5 mounted on brackets provided at the ends of the tank 1. Mounted on the shaft 4 are disks perpendicular to the shaft and spaced from each other, these disks consisting of filter sectors 6 having as their surface a close mesh made of plastic so that they may on their surface retain the fibres which one desires to filter out of the suspension in the tank 1, while they let the liquid through. For removal of the filtrate, the hollow interior of each sector communicates by holes 7 in the mantle of the shaft 4 with the interior of the shaft 4, which has been provided with a slide member 3 having a length equal to the length of the entire shaft and which divides the interior of the shaft 4 transversally into three separate sectors 8, 9 and 12 (FIG. 2). In the longitudinal direction the slide member 3 is confined by the ends 13 and 14 having a diameter consistent with the inner diameter of the shaft 4, so that in the interior of the shaft 4 elongated chambers with the cross section of the sectors 8, 9 and 12 are formed, which are so well sealed that they can be set under vacuum or pressure. The end 14 (FIG. 1) is connected by an attachment 2 to the bracket projecting from the end wall of the tank 1 so that the slide member 3 cannot rotate along with the shaft 4 when the latter is rotated by means of a drive (not depicted in FIG. 1) coupled to the journal pin 15. Through the end 14 of the valve shaft 4 pipes 10 and 11 have been carried into the chambers 8 and 9, through which the filtrate is withdrawn from the interior of the shaft 4. The removal tubes 10 and 11 and thereby also the chambers 8 and 9 are connected to a vacuum source (not depicted).

The disk filter consistent with the above-described embodiment of the invention operates as follows.

When the disk filter is rotated in the direction of arrow A in FIG. 2, each filtering sector 6 thereto attached, in its turn, dips into the fibre suspension in the tank 1. Hereby the suction active in the chamber 8 over the whole length of the shaft 4 draws the fibre substance present in the solution onto the surface of all filtering sectors 6 in the same angular position, and the filtrate passes through the holes 7 into the chamber 8 and thence through the pipe 10 to the outside of the filter. As a rule this first filtrate also contains fine fibre substance, because for practical reasons the mesh of the filter sectors cannot be made so fine that it would retain all the solid matter from the fibre suspension that is being filtered. In the next step when the filtering sector comes under the influence of the vacuum in chamber 9, a fibre course has already precipitated on the surface of the filtering sector 6 and acts as an efficient fine matter retaining agent. It follows that from all filtering sectors 6 in register with the chamber 9 filtrate of higher purity is obtained than from those opposite the chamber 8. The filtrate coming from the chamber 9 is withdrawn from the pipe 11 to the outside of the filter, and the filtrates coming from each of the removal pipes 10 and 11 are separately handled in the subsequent process steps. As it rises to be above the surface of the tank 1 and opposite to the chamber 12 the vacuum within the filtering sector 6 disappears for the reason that in chamber 12 normal atmospheric pressure prevails for the reason that opposite the chamber 12 the fibre layer is removed with the aid of water jets located between the filtering disks (not depicted), which topple the filter layers into trays 16 between the filtering disks (FIG. 1). The water jets also wash the mesh surfaces of the filtering sectors clean before they dip into the tank 1 once again, whereupon the action already described repeats itself.

The invention is not confined to the embodiment presented in the drawings, and it may be modified within the scope of the claims.

I claim:

1. Filter apparatus for filtering a liquid comprising: tank means containing therein a liquid to be filtered; an elongated hollow shaft rotatably mounted on said tank means; a plurality of disk filters arranged on said hollow shaft at spaced intervals along the length thereof and affixed to said hollow shaft for rotation therewith, said disk filters essentially comprising a generally circular configuration having said hollow shaft extending through the central portion thereof, said disk filters being arranged to be at least partially submerged in the liquid contained in said tank means for passage therethrough upon rotation of said shaft; means on said disk filters defining hollow filtration sectors extending radially from said hollow shaft to the periphery of each of said disk filters, each of said hollow sectors having radially extending opposed filtration faces through which liquid may pass into said filtration sectors, each of said filtration faces being defined by filter material operative to filter particulate matter from liquid passing therethrough into said filtration sectors; means defining flow holes in said shaft to place said hollow filtration sectors in flow communication with the hollow interior of said shaft; a slide member having a generally Y-shaped sectional configuration and extending longitudinally along said shaft within the hollow interior thereof, said slide member being affixed relative to said tank means and arranged to have said shaft rotate relative thereto; said slide member thereby defining the interior of said shaft into three interior chambers each adapted to be placed in flow communication with said filtration sectors through said flow holes upon rotation of said shaft relative to said slide member; a pair of end plates located on opposite ends of said shaft closing off said three interior chambers, with said three interior chambers thus extending continuously between said pair of end plates; and vacuum means connected to two of said interior chambers through at least one of said end plates to create a suction effect in said two chambers to draw liquid from said tank means through said filtration faces and into said two interior chambers to effect filtration thereof.

2. Filtration apparatus according to claim 1 wherein said slide member and said end plates are in sealed sliding engagement with the inner surface of said hollow shaft in order to prevent leakage of filtrates from said interior chambers.

* * * * *